United States Patent [19]

Trenkler

[11] Patent Number: 4,552,401
[45] Date of Patent: Nov. 12, 1985

[54] FOLDING ROOF FOR VEHICLES, ESPECIALLY PASSENGER MOTOR VEHICLES

[75] Inventor: Werner Trenkler, Asperg, Fed. Rep. of Germany

[73] Assignee: Dr. Ing. h.c.F. Porsche AG, Fed. Rep. of Germany

[21] Appl. No.: 444,704

[22] Filed: Nov. 26, 1982

[30] Foreign Application Priority Data

Nov. 28, 1981 [DE] Fed. Rep. of Germany ....... 3147214

[51] Int. Cl.[4] .............................. B60J 7/14; B60J 7/18
[52] U.S. Cl. ..................................... 296/219; 160/213
[58] Field of Search ............... 296/216, 218, 219, 220, 296/109, 141, 98, 100; 160/231 R, 231 A, 213

[56] References Cited

U.S. PATENT DOCUMENTS 3,348,877 10/1967 Caramanna ......................... 296/219
3,476,437 11/1969 Schroeder et al. .................. 296/218
3,494,659 2/1970 Trenkler .............................. 296/219

FOREIGN PATENT DOCUMENTS 570745 12/1957 Italy ..................................... 296/219

Primary Examiner—Robert B. Reeves
Assistant Examiner—Dennis H. Pedder
Attorney, Agent, or Firm—Craig & Burns

[57] ABSTRACT

A folding roof for vehicles, especially passenger motor vehicles, is detachably secured at a windshield frame and at a roll bar bridging the passenger space and is essentially composed of laterally disposed longitudinally extending girders, of a plurality of struts arranged between the longitudinal girders extending generally parallel to the girders and a flexible roof covering, connected to and supported by the longitudinal girders and the struts.

In order to create a folding roof which, with lowest possible weight, has a high form rigidity, i.e., strength, and which when folded-together requires as low as possible a structural height and which is also utilizable more individually, alternately form-rigid struts and elastic struts are arranged to extend in the longitudinal direction of the vehicle in such a manner that nonreinforced sections of the covering between the struts are minimized.

19 Claims, 7 Drawing Figures

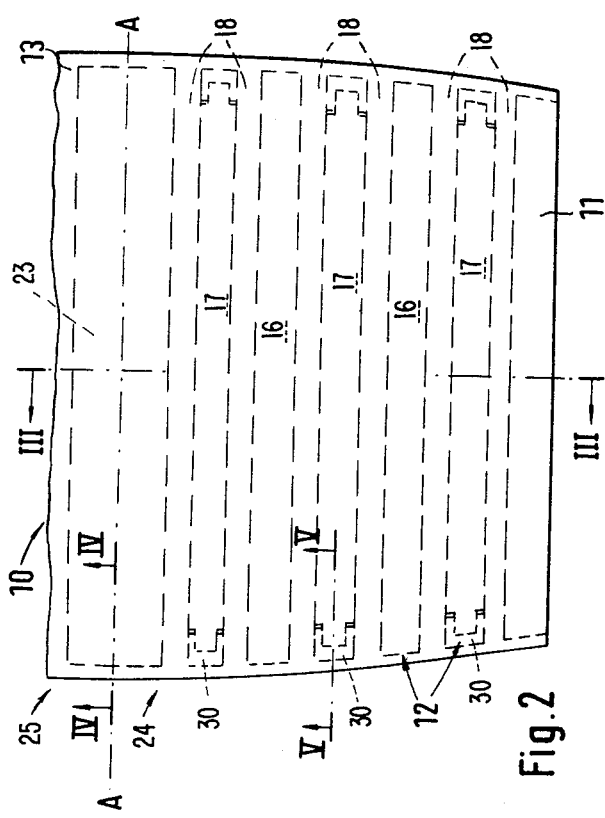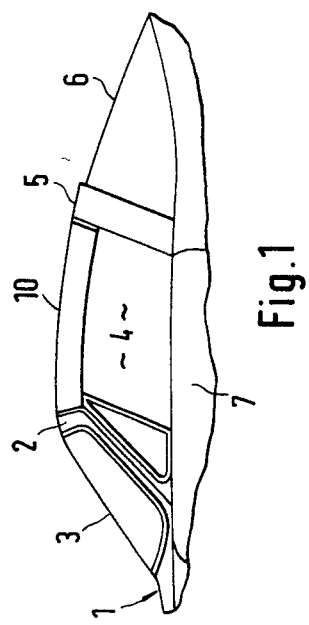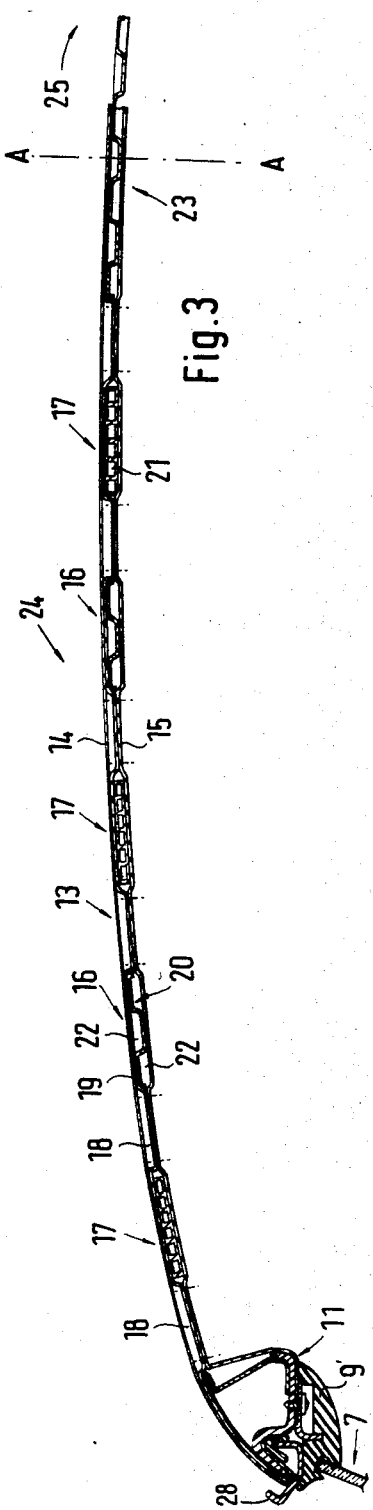

FOLDING ROOF FOR VEHICLES, ESPECIALLY PASSENGER MOTOR VEHICLES

The present invention relates to a folding roof for vehicles, especially passenger motor vehicles, which is detachably secured at a windshield frame and at a roll bar bridging the passenger space. The folding roof is essentially composed of laterally disposed longitudinally extending girders, a plurality of struts arranged between the longitudinally extending girders extending generally parallel thereto, and a roof covering, the longitudinally extending girders and the plurality struts forming a frame to which the roof covering is connected.

A known folding roof (German Offenlegungsschrift No. 14 55 743) generally of the aforementioned type includes several form-rigid struts between oppositely disposed longitudinally extending girders. However, these struts are constructed relatively narrow leaving substantial nonreinforced roof sections disposed therebetween so that the folding roof has an inadequate support for the top covering. All of the struts of the folding roof have, in this known installed condition, a similarly directed curvature which when the roof is in a folded condition have the disadvantage that the respectively adjacent struts lie one above the other with oppositely directed curvatures. Especially with passenger motor vehicles which exhibit a pronounced roof curvature, the folded-together roof assumes a relatively large structural height, as a result of which the accommodation in the vehicle is made more difficult.

Additionally, by reason of the relatively wide unreinforced roof sections, no defined folding movement is possible which, accordingly, causes the installation and disassembly of the folding roof to require a large amount of time. Furthermore, this construction permits driving with or without the folding roof and does not make possible an opening of the folding roof over only half of the vehicle, i.e., one side only.

It is the aim of the present invention to provide a folding roof which with lowest possible weight exhibits a high form-rigidity, i.e., strength, which requires as little structural height as possible when folded-together and which permits each side of the vehicle roof to be utilized individually.

The underlying problems are solved according to the present invention in that the support frame for the flexible covering of the folding roof alternately includes form-rigid struts and elastic struts extending in the longitudinal direction of the vehicle, in such a manner that unreinforced sections of the covering between the struts are minimized.

The advantages primarily achieved with the present invention reside in that as a result of the construction of the folding roof with alternately arranged form-rigid and elastic struts, between which only narrow sections of nonreinforced roof covering exist, a high form-rigidity and stiffness of the folding roof is achieved. Additionally, a light-weight folding roof is created by the construction of the elastic struts of plastic material, especially with a hollow chamber-like cross section. The possibility exists, by the use of a form-rigid strut which is arranged in the vehicle longitudinal center plane and which has a greater width, of utilizing the folding roof more individually, i.e., the possibility of folding the folding roof on only one side of the vehicle while the other section of the passenger space can remain covered by a part of the folding roof.

With a closed folding roof, the elastic struts assume the shape of the adjacent form-rigid struts whereas during the folding of the roof, the elastic struts adapt themselves to the shape of the form-rigid struts disposed therebelow and thus a smallest possible structural height of the folded-together package is achieved. Conditioned by the relatively narrow sections of nonreinforced roof covering, the struts forcibly assume a position lying flush one above the other, as a result of which a defined folding movement is achieved which assures a rapid disassembly as well as a rapid installation.

These and other objects, features and advantages of the present invention will become more apparent from the following description when taken in connection with the accompanying drawing which shows, for purposes of illustration only, one embodiment in accordance with the present invention, and wherein:

FIG. 1 is a partial side elevational view of a vehicle having folding roof in accordance with the present invention;

FIG. 2 is a partial plan view of the folding roof, on an enlarged scale;

FIG. 3 is a cross-sectional view, taken along line III—III of FIG. 2;

Figure 4:
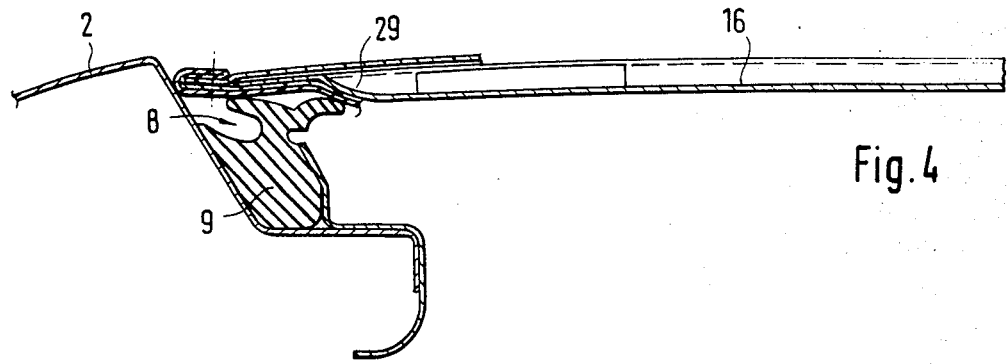
FIG. 4 is a partial cross-sectional view, on an enlarged scale, taken along line IV—IV of FIG. 2.

Referring now to the drawing wherein like reference numerals are used throughout the various views to designate like parts, the motor vehicle, partially illustrated in FIG. 1, generally designated by reference numeral 1 includes a windshield frame 2 with a windshield 3, a roll-bar 5 bridging the passenger space 4, a rear window 6 and doors 7. The roll-bar 5 is assembled in a known manner of pressed-out or stamped-out sheet metal parts that form a box-shaped hollow body.

A groove or recess in the windshield frame 2 for abutment of a sealing body 9 thereagainst, generally designated by reference numeral 8 (see FIG. 4), extends in the vehicle transverse direction. Ideally, a similar groove or recess (not shown) is provided at the roll-bar 5 for abutment of a sealing body 9 thereagainst.

A folding roof 10 is detachably secured between the windshield frame 2 and the roll-bar 5, which extends in the transverse direction between the two doors 7 of the vehicle 1, and which in the longitudinal direction of the vehicle abuts with the sealing bodies 9'. The fastening of the folding roof at the windshield frame 2 and at the roll-bar 5 takes place by means of conventional retaining elements, not illustrated in detail herein (the fastening means may be of the form as described, for example, in German Offenlegungsschrift No. 14 55 743).

The folding roof 10 includes laterally disposed longitudinally extending girders 11, a plurality of struts 12 arranged between the longitudinal girders 11 extending generally parallel to the longitudinal direction of the vehicle and the longitudinally extending girders 11, and a roof covering generally designated by reference numeral 13 (FIG. 3). A laterally disposed longitudinally extending girder 11 extends adjoining each of the doors 7 of the motor vehicle 1 and are made as cast parts from light-weight metal. The roof covering 13 is formed by a flexible outer skin 14 and by a flexible foldable inner covering 15. The inner covering 15 includes two layers which are sewed together in the vehicle longitudinal direction on either side of each of the struts 12. The thus-resulting hollow spaces formed by the sewed-together layers serve for the accommodation of the struts 12 and fix the same in position relative to another.

The struts 12 arranged between and extending generally parallel to the longitudinal girders 11 are constructed in alternate sequence as form-rigid struts 16 and as elastic struts 17, and more particularly in such a manner that nonreinforced roof sections 18 remain between the struts 16 and 17. The struts 12 extending adjacent the longitudinal girders 11 are preferably constructed as elastic struts 17.

The form-rigid struts 16 are formed by pressed-out sheet metal parts 19 and are shaped both in the vehicle longitudinal direction as also in the vehicle transverse direction corresponding to the curvature of the roof contour. For purposes of increasing the rigidity, the form-rigid struts 16 have a profiling 20 in cross section.

Figure 6:
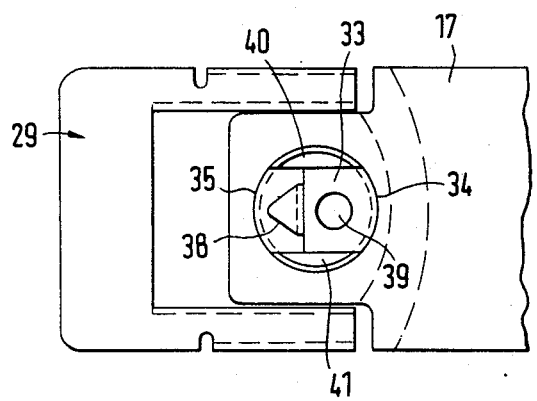
FIG. 6 is an elevational view, taken in the direction of arrow X of FIG. 5.

The elastic struts 17 are made from a suitable plastic material such as fiberglass reinforced polycarbonate, polyamide, polyacetal, or the like. For reasons of weight-saving, preferably a hollow chamber-like profile 21 of polycarbonate is used for the elastic struts 17 (FIG. 6). Layers 22 of foam-rubber or the like are provided above and below the form-rigid-struts 16 and possibly the elastic struts 17.

The elastic struts 17 possess in their original condition a rectilinear contour. They are not bent either in the vehicle longitudinal or in the vehicle transverse direction. However, with a closed folding roof 10, conditioned by the form-rigid struts 16 adjoining on both sides and the tension of the roof covering 13, the elastic struts 17 assume the contour of the form-rigid struts 16. A further advantage of the alternate arrangement of form-rigid struts 16 and elastic struts 17 is that the folding roof 10 produces a slight structural height in the folded-together condition since the elastic struts 17 can assume the shape of the form-rigid struts 16 disposed therebelow in the folded-together condition.

According to FIG. 3, a form-rigid strut is arranged in the vehicle longitudinal center plane A—A which has a greater width than the remaining struts 12 and which serves as a base bearer for the two roof halves 24 and 25 of the folding roof 10. The two roof halves 24 and 25 are adapted to be folded together accordion-like with the struts 12 lying one above the other. The base bearer 23 has preferably a somewhat greater width than the two roof halves 24 and 25 of the folding roof 10 disposed adjacent one another in the folded condition.

The two roof halves can be folded together independently of one another. This construction makes it possible to fold together only one roof half, for example, the roof half 24, whereas the other roof half 25 continues to cover off a part of the passenger space 4. For fixing the installed roof half 25, retaining means (not illustrated in detail) are provided in a center section of the windshield frame 2 and of the roll-bar 5 which cooperate with support sections of the base bearer 23. When, for example, roof half 24 is folded together and disposed on the base bearer 23, it is retained thereat in position by means of clamping elements (not shown in detail).

Figure 7:
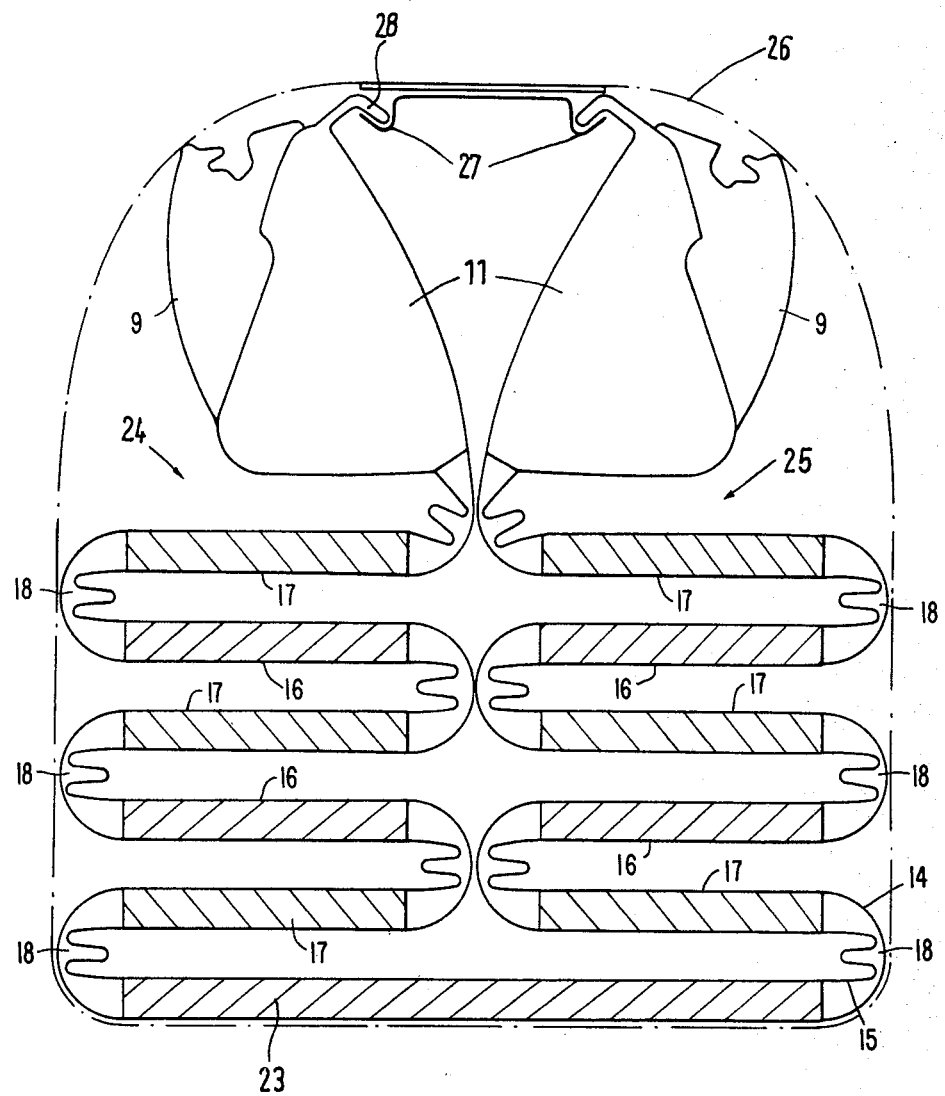
FIG. 7 is a schematic cross-sectional view through the folded-together folding roof in accordance with the present invention when stored in a storage container.

For storing the folded-together folding roof 10 in the luggage space, the folding roof 10 is provided with a casing or covering 26 (see FIG. 7). To facilitate storage, clamp-like retaining members 27 are attached to the inside of this casing or covering 26, into which engage sections 28 of the longitudinal girders 11 to thereby hold the roof in position.

The nonreinforced roof sections 18 between the struts 16 and 17 have a width such that during the folding operation, a positive stacking of the struts 16 and 17 lying flush one above the other takes place. This forcible folding movement enables a rapid installation and disassembly of the folding roof.

Figure 5:
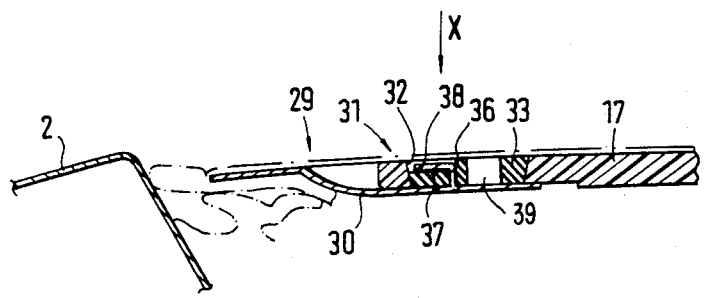
FIG. 5 is a partial cross-sectional view, on an enlarged scale, taken along line V—V of FIG. 2.

Within the area of the sealing bodies 11 arranged at the windshield frame 2 and at the roll-bar 5, all struts 16 and 17 include form-rigid support sections 29, as a result of which a good sealing effect is achieved. The support sections 29 and the form-rigid struts 16 are made in one piece (FIG. 4) whereas in connection with the elastic struts 17, the support sections 29 are formed by separate structural parts 30 which are connected with end sections 31 of the elastic struts 17 (FIG. 5).

The cross section of the support sections 29 is thereby identical with all struts 12, as viewed in the vehicle longitudinal direction, so that within the area of the struts 16 and 17, a constant sealing surface is achieved. For fastening each structural part 30, an aperture 32 tapering in the downward direction is provided at corresponding end sections 31 of the elastic strut 17, into which is inserted a connecting member 33 made of elastic material (rubber). The connecting member 33, elongated as viewed in plan view, is supported in the opening 32 exclusively along its end areas 34 and 35 and is provided with a slot-shaped opening 36 as well as with a support section 37 (FIG. 5). A retaining tongue 38 formed as part of the structural part 30 and bent up is extended through the slot-shaped opening 36 and is folded over and supported at the support section 37. The connecting member 33 is provided with a circularly shaped aperture 39 adjacent the support section 37. This aperture 39 as well as the sections 40 and 41 remaining free laterally adjacent the connecting member 33 represent a space for the connecting member 33, whence the different longitudinal expansions of the elastic struts can be compensated for without changing the position of the support sections 29.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A folding roof for vehicles, bridging a passenger space by extending between a windshield frame and a roll-bar, said folding roof comprising a roof covering means, laterally disposed longitudinally extending girder means for defining the lateral edges of the folding roof, and a plurality of strut means arranged between the longitudinally extending girder means extending substantially parallel to said girder means and a longitudinal center plane of the vehicle for supporting the covering means, said covering means interconnecting the longitudinally extending girder means and the strut means, said strut means including alternately disposed form-rigid strut means and elastic strut means disposed such that unsupported sections of the covering means remain between the strut means.

2. A folding roof according to claim 1, wherein the folding roof includes a form-rigid strut means in the longitudinal center plane of the vehicle which serves as base bearer means for two roof halves each adapted to be folded together accordion-like, the two roof halves being adapted to be folded together independently of one another.

3. A folding roof according to claim 2, wherein the base bearer means has a larger width than the combined width of the folded roof halves which are disposed adjacent one another when in a folded together condition.

4. A folding roof according to claim 1, wherein the nonreinforced sections of the covering means have a width such that during folding, a stacking of the plurality of strut means results.

5. A folding roof according to claim 1, wherein the elastic strut means are made from a suitable plastic material.

6. A folding roof according to claim 5, wherein the plastic material is selected from the group consisting of fiberglass reinforced polycarbonate, polyamide, and polyacetal.

7. A folding roof according to claim 5, wherein the elastic strut means have a hollow chamber-like profile.

8. A folding roof according to claim 1, wherein sealing body means are included for sealing the roof relative to the vehicle, the strut means being provided with support sections within the area of sealing body means.

9. A folding roof according to claim 8, wherein the support sections and the form-rigid strut means are made in one piece.

10. A folding roof according to claim 8, wherein the support sections of the elastic strut means are formed by separate structural parts which are secured at end sections of the elastic strut means.

11. A folding roof according to claim 10, wherein the fastening of each support section structural part to a corresponding end section of the elastic strut means includes a downwardly tapering opening into which is inserted a connecting member, said connecting member being provided with a support section, on which is supported a retaining tongue of the structural part.

12. A folding roof according to claim 11, wherein the connecting member elongated as viewed in plan view, is supported in the opening exclusively along its end areas and the connecting member is provided with aperture means adjacent the support section.

13. A folding roof according to claim 1, wherein the elastic strut means have a hollow chamber-like profile in cross section.

14. A folding roof according to claim 1, wherein the strut means includes support sections and a sealing body means disposed relative to the vehicle for sealing the roof relative thereto.

15. A folding roof according to claim 14, wherein the support sections and the form-rigid strut means are made in one piece.

16. A folding roof according to claim 15, wherein the support sections of the elastic strut means are formed as separate form-rigid structural parts which are secured at end sections of the elastic strut means.

17. A folding roof according to claim 16, wherein the fastening of each support section structural part to a corresponding end section of the elastic strut means includes a downwardly tapering opening into which is inserted a connecting member, said connecting member being provided with a support section, on which is supported a retaining tongue of the structural part.

18. A folding roof according to claim 17, wherein the connecting member, elongated as viewed in plan view, is supported in the opening exclusively along its end areas and the connecting member is provided with aperture means adjacent the support section.

19. A folding roof according to claim 14, wherein the folding roof includes a form-rigid strut means in a vehicle longitudinal center plane which serves as base bearer means for two roof halves each adapted to be folded together accordion-like, the two roof halves being adapted to be folded together independently of one another.

* * * * *